United States Patent [19]
Forman et al.

[11] Patent Number: 5,624,618
[45] Date of Patent: Apr. 29, 1997

[54] PROCESS OF MAKING BRAIDED COMPOSITE PART

[75] Inventors: Thomas P. Forman, Greenwich; Rance B. Fox, Milford; George E. Sabak, Monroe, all of Conn.; Timothy A. Sands, Muncy Valley, Pa.; Paul A. Vallier, Kensington, Conn.

[73] Assignee: Dow-United Technologies Composite Products, Inc., Wallingford, Conn.

[21] Appl. No.: 486,321

[22] Filed: Jun. 7, 1995

Related U.S. Application Data

[62] Division of Ser. No. 291,284, Aug. 16, 1994, which is a division of Ser. No. 152,508, Nov. 15, 1993, Pat. No. 5,399,395, which is a continuation of Ser. No. 704,999, May 24, 1991, abandoned.

[51] Int. Cl.$^6$ .............. B29C 70/30; B32B 5/12; B32B 31/00
[52] U.S. Cl. .......... 264/103; 156/148; 156/155; 156/173; 156/174; 156/175; 156/245; 264/136; 264/137; 264/152; 264/157; 264/159; 264/257; 264/258; 264/317
[58] Field of Search .............. 264/103, 136, 264/137, 152, 157, 159, 257, 258, 317; 156/148, 155, 173, 174, 175, 245

[56] References Cited

U.S. PATENT DOCUMENTS 5,152,860  10/1992  Grossman et al. .............. 156/173

*Primary Examiner*—Leo B. Tentoni
*Attorney, Agent, or Firm*—McAulay Fisher Nissen Goldberg & Kiel

[57] ABSTRACT

A multi-vane structure for incorporation in an aircraft gas turbine engine has vanes of complex geometry made of braided fibers which are continuous about the cavities defined by the vanes. These complex geometry parts are prepared by providing a plurality of removable mandrels, stacking the mandrels along a horizontal axis in a cavity end to cavity end configuration, braiding about the mandrels, cutting the mandrels adjacent the cavity end faces, side stacking the mandrels so the faces are placed in a parallel orientation and molding. Utilizing braided fibers instead of hand lay-up woven fibers eliminates seams and produces cavities having continuous fibers about the periphery thereof which substantially increases the strength and dimensional reproducibly of the part.

10 Claims, 10 Drawing Sheets

PROCESS OF MAKING BRAIDED COMPOSITE PART

CROSS-REFERENCE TO RELATED APPLICATIONS

This application is a division of Ser. No. 08/291,284, filed Aug. 16, 1994, now pending which was a division of application Ser. No. 08/152,508 filed Nov. 15, 1993, now U.S. Pat. No. 5,399,395, which was a continuation of application Ser. No. 07/704,999 filed May 24, 1991, now abandoned.

TECHNICAL FIELD

This invention relates to braided composite parts of complex geometry and more particularly to braided composite multi-vane structures for aircraft gas turbine engines.

BACKGROUND

A typical aircraft mounted gas turbine engine incorporates thrust reversal devices to slow the plane during landing. Among the devices used are multiple vane structures which direct compressor air in a direction opposite to the direction of aircraft travel to produce a braking effect. Reverse thrust is achieved when a transcowl translates aft to deploy blocker doors in the fan bypass air stream, at the same time opening passages which redirect fan air to exit through the multiple vane structures commonly know as "cascades".

These cascades usually comprise a plurality of individual magnesium die castings or aluminum vanes joined to a pair of platforms by dip brazing, which produces a relatively heavy structure of multi part construction. In addition, due to the assembly method, the critical joint areas between the vane and platform are susceptible to fatigue or stress failure.

Attempts have been made to produce cascades from composites. However, due to the complex geometry of the turning vane surfaces, efforts to produce the cascades as composites from woven fiber in a hand lay-up process have been generally unsatisfactory, suffering from poor dimensional reproducibility between parts and high labor costs. Such parts in the past, whether of metal or woven fabric composite, have exhibited relatively low load carrying capability, with the woven composite exhibiting fiber discontinuity in seam areas and variability of fiber orientation.

SUMMARY OF INVENTION

It is an object of the present invention to produce parts of complex geometry using braided fibers.

It is another object to provide parts of complex geometry using braided fibers in combination with precision closed cavity resin transfer molds and removable mandrels.

It is a further object to produce parts of complex geometry which have high strength, reduced weight, excellent dimensional and structural reproducibility and which are not labor intensive to produce.

It is a further object to produce multi-vane structures of high strength and low cost with a minimum of fabrication steps.

These and other objects of the present invention are achieved by a braided composite part of complex geometry which has a cavity defined by walls having shaped surfaces. The walls are made of continuous braided fiber, impregnated with a resin and cured. In a particular embodiment, the complex geometry part is a cascade comprising a plurality of curved vanes disposed between at least two platforms, the vanes and platforms defining a plurality of cavities therebetween. Each pair of adjoining vanes and associated platform portions is composed of continuous braided fiber which surrounds the cavity.

Braided composite parts of complex geometry are made by providing a plurality of net shaped removable mandrels having the desired cavity geometry, stacking the mandrels into an assembly in an end cavity to end cavity relationship along a horizontal axis, braiding over the stacked assembly, cutting the braided assembly at the end cavity locations, side stacking the cut and separated mandrels such that the cavity ends are placed next to each other, and molding.

BRIEF DESCRIPTION OF THE DRAWINGS

FIG. 1a is an enlarged view of a multi-vane structure of FIG. 1.

DETAILED DESCRIPTION OF THE INVENTION

Figure 1:
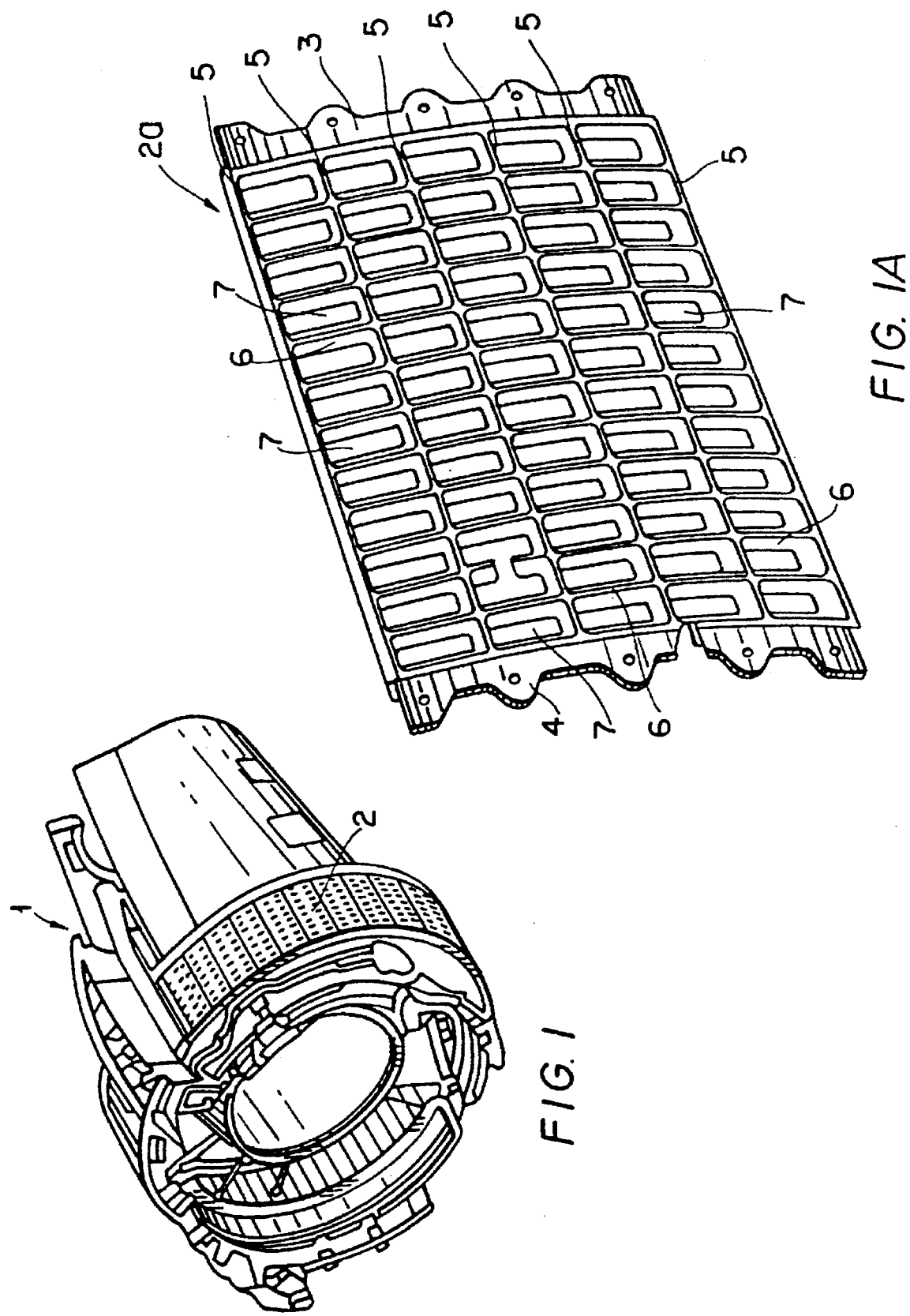
FIG. 1 is a perspective view of a gas turbine engine incorporating multi-vane structures used for effecting thrust reversal.

Referring to FIG. 1, a gas turbine engine 1 has a plurality of multi-vane structures 2 disposed radially around the engine. These structures redirect air flow in a manner to produce a braking effect during aircraft landing.

FIG. 1a is an enlarged view of one multiple vane structure commonly known as a cascade. The structure 29 has end flanges 3 and 4, platforms 5, and a plurality of directing vanes 6. Since the structure is disposed on the engine periphery, the vanes and platforms are curved, to conform to the engine curvature. The vanes and platforms define a plurality of cavities 7 therebetween. In certain cascades, the platforms themselves may be of complex curvature and thereby also form vane components for redirecting airflow.

Figure 2:
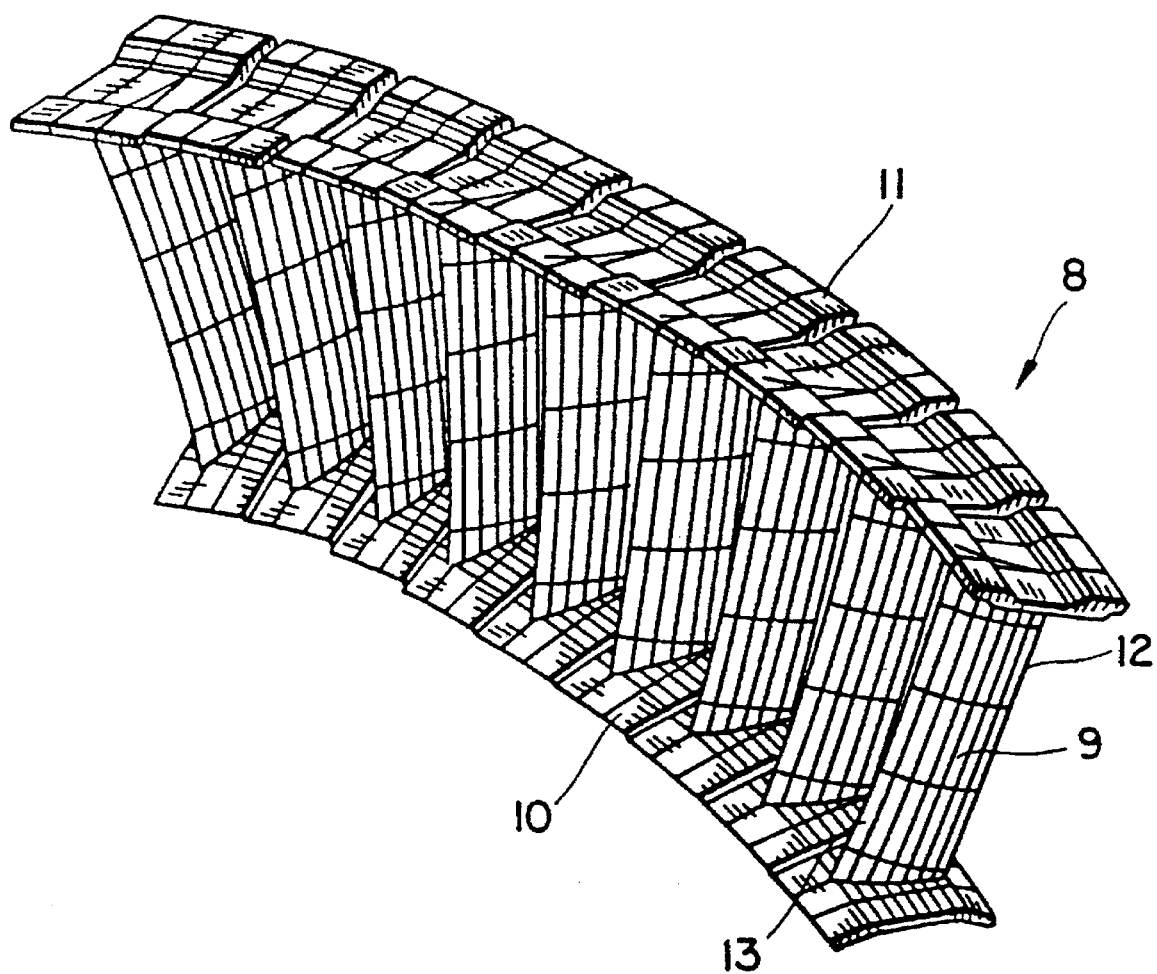
FIG. 2 is a perspective view of a radial compressor vane assembly for a gas turbine engine.

Referring to FIG. 2, a radial compressor vane inlet assembly 8 is composed of a plurality of complex curved vanes 9 disposed between platforms 10 and 11. The vane geometry is determined by air flow requirements and typically each vane is curved from a leading edge 12 to a trailing edge 13. Platforms 10 and 11 form the substructure of the inner and outer shroud housing.

Figure 3:
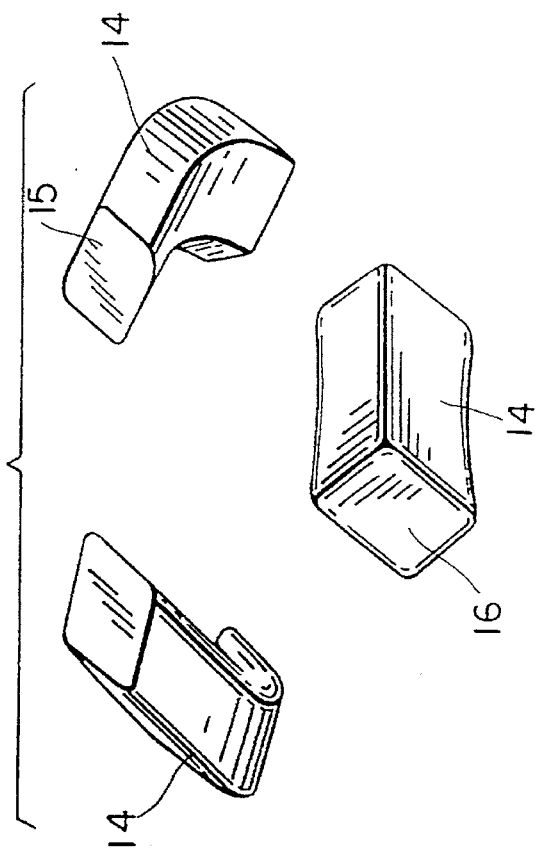
FIG. 3 is a view of several mandrels that can be used for producing braided parts of complex geometry according to the present invention.

Referring to FIG. 3, three mandrels 14 are shown which duplicate the cavities 7 which exist between the complex curvature vanes 6 and the platforms 5 in the multi-vane structure 2. Each mandrel has surfaces curving to various degrees which differentiate from the inlet to outlet sides of the structure 2 and also conform to the curvature of the engine. Such mandrels have quite complex shapes and structures for defining these cavities. Each side of the mandrel defines a vane or platform surface required by the complex part. Since these are typically identical in a cascade, a plurality of mandrels are produced to produce a single cascade. The end surfaces 15 and 16 define the cavity inlet and outlet openings.

To produce a braided cascade, each net shaped cavity mandrel 16 is made of a material which is removable either by dissolution in a solvent or by melting. This is required in many cases as the complex geometry of the cavity surfaces may lock the mandrel in place and prevent mechanical removal. The mandrels 14 are preferably made out of a low-melting eutectic alloy or other heat sensitive material and are removed after molding by heating to the melting temperature. The mandrels may also be made out of a material such as PARAPLAST™ which is a fairly rigid material removable by dissolution in water at a temperature of about 180° F. A rigid polymer or ceramic made from a dissolvable material could also be used. If the cavities are of a shape where mechanical removal of the mandrel is possible, solid mandrels made from a non-melting metal, polymer, or silicon rubber can also be employed. Some rigidity and surface hardness is required to resist the compressive forces which occur when fibers are placed on the mandrels during braiding, and for supporting the braided mandrels during manipulation prior to molding and during resin injection and cure as will be discussed below.

Figure 4:
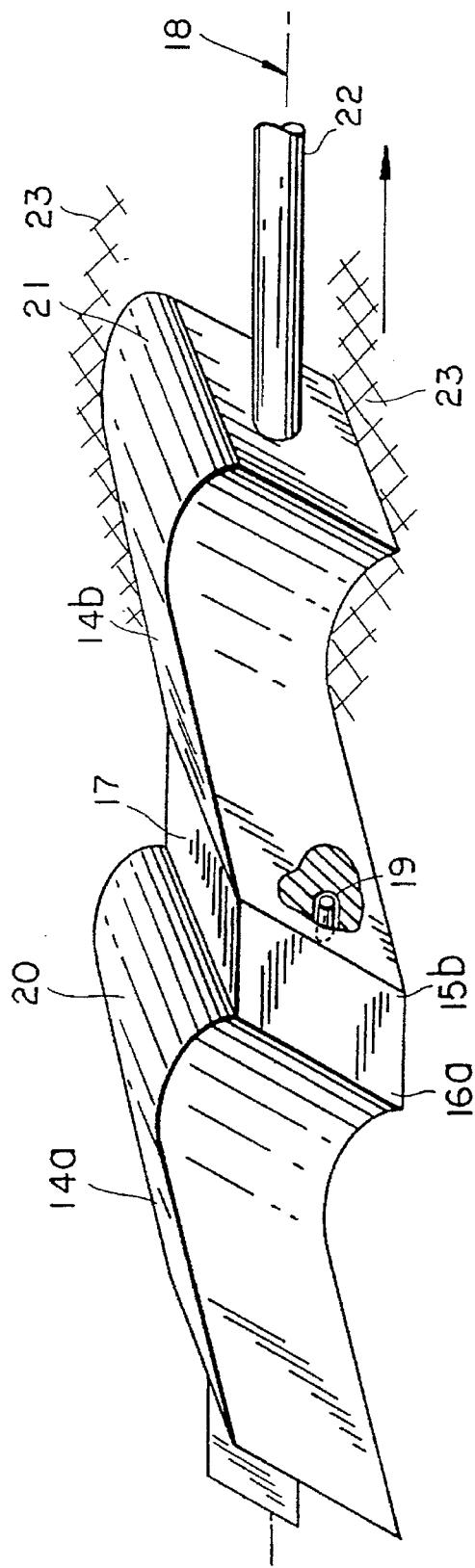
FIG. 4 is a view showing a partially braided plurality of mandrels in a stacked assembly.

Referring to FIG. 4, two mandrels 14a and 14b are separated by a spacer 17. The mandrels are placed in a stack along a longitudinal axis 18. The mandrels 14a and 14b are placed in an end to end relationship along the longitudinal axis. The surfaces 15b and 16a mate with the spacer which is shaped to cover both surfaces completely. Thus the spacer is used to create a smooth transition zone in the mandrel stack assembly to accommodate the different size and angles of the complex shaped mandrels when placed in an end to end assembly. Such spacers are necessary when the cavity inlet and outlet openings require mandrel surfaces which have different diametrical sizes or when the mandrels have complex curvature. Such spacers also define preform cutting areas for mandrel separation. While two mandrels are shown, any number of mandrels and spacers could be placed in this end to end assembly, limited only by practical considerations when entering the braiding process.

In the embodiment in FIG. 4, at least one locating socket 19 is provided in each surface 15 and 16 to align the mandrels along the axis for braiding. The socket is sized to accept a pin 20 which extends from the spacer. When aligned, a passage 21 extends through the stacked mandrels, and a continuous rod 22 passes through all the stacked mandrels and spacers. Preferably, the rod is provided with means for holding the mandrels together in a stack for braiding. For example, the rod may have threaded ends and include nuts and flat washers for compressing the stack. Of course, other alignment structures could be used to produce a fairly rigid stack. For example, instead of pins and sockets, two through rods could be used to assemble the stack and prevent mandrel twisting or misalignment during handling.

After assembly, the mandrels are mounted on a braiding apparatus (not shown) for the addition of fibers. Such braiding apparatus is know in the art. For example, a 144 carrier braiding machine with a moveable gantry system such as manufactured by Wardwell may be used. FIG. 4 shows the stacked mandrels partially braided by fibers 23. The braid must be tubular to cover the mandrel perimeter and can have either a bi-axial, tri-axial, or 3D multi-axial architecture. Bi-axial braids comprise two (2) sets of interlacing fibers that form a cross-linked pattern and are preferred for complex curvature multi-vane preform structures. If structurally required, tri-axial braids which incorporate an additional set of warp (axial) fibers may also be used.

Previously it had been thought that due to the difficulty in laying up woven fabric to highly curved mandrel surfaces, reproducible and low labor intensive composite part preforms of complex geometry could not be achieved. However, it has been discovered that by directly braiding over the mandrel surfaces in-line in the specified stacked manner described herein, conformance of the tensioned fiber to the mandrel surfaces is achieved. To produce a net or near net shaped part with a seamless and continuous fiber disposed over complex geometry surfaces, particular care must be exercised in the choice of fiber, fiber braid angle, fiber size, fiber twist, fiber carrier tension and the total number of bias carriers to achieve adequate coverage and fiber preform areal density over the entire mandrel surface without causing fiber bulking and/or fiber bridging across concave surfaces. "Braid angle" means the angle of the fiber relative to the horizontal axis of the stacked mandrels during braiding. This angle is typically set by adjusting the angle setting on the carrier braiding machine and machine speed for the particular diametrically sized mandrel.

Depending upon the mandrel shape, size and fiber type, a braid angle between plus/minus 45° and 85° will achieve optimum preform and final component structural properties. Braiding at an angle below 45° can cause the drawn fiber to bridge across the concave surfaces. Preferably, a braid angle of 70°–80° is used. Fiber tension should be provided to assure that the fibers conform to the mandrel surfaces yet not be so high as to result in fiber damage caused by the braider fiber carriers.

While the braid angle may be set for example, at +/−80°, as the fibers are braided onto the complex geometry surfaces, the actual surface fiber angles may vary due to the geometric complexity of local surface contour or due to a skewed mandrel stacking orientation relative to the braiding direction. For example, with a skewed mandrel stacking orientation, the fibers traveling clockwise around the mandrel conform at a different surface angle than the interlocking counter clockwise fibers, resulting in a non-symmetric fiber pattern (i.e. 90°, −60°) relative to the end surfaces. Although this results in an "unbalanced" fabric, as long as the fibers conform to the surfaces and sufficient fiber areal density is maintained on all mandrel surfaces, a highly reproducible part of high strength and uniform thickness is achieved.

The fiber size may vary from a single or multiple end 1K tow to 12K tow. The fibers may be of any type such as fiberglass, graphite, aramid, polybenzimidazole, ceramic, quartz, metal or a hybrid combination of such fibers. Metal fibers could also be used. Graphite and aramid are preferred for cascades and vane sections.

The fibers may be braided in dry form or in prepreg form or be treated with resin during braiding. Following the braiding operation, the fibers should be stabilized prior to preform cutting and mandrel separation. If dry fiber is used, the braided mandrel assembly can be treated with an adhesive such as spray-77, a hot melt thermoplastic adhesive made by the 3M company, or another stabilizing material after braiding. An uncatalyzed resin which is compatible with the to be applied final resin may also be used to hold the fibers in place. In either event, the fibers should be stabilized at least in the areas adjacent the mandrel spacers to allow cutting through the fibers without causing edge fraying during and after cutting.

In one embodiment of the present invention, the fibers are treated with a binder for stabilization by either spraying the binder in dry powder form or in solution onto the braided assembly. The assembly is then heated to the binder melting temperature. After cooling, the binder resolidifies and stabilizes the fibers. The braid is then cut adjacent the spacers.

Figure 5:
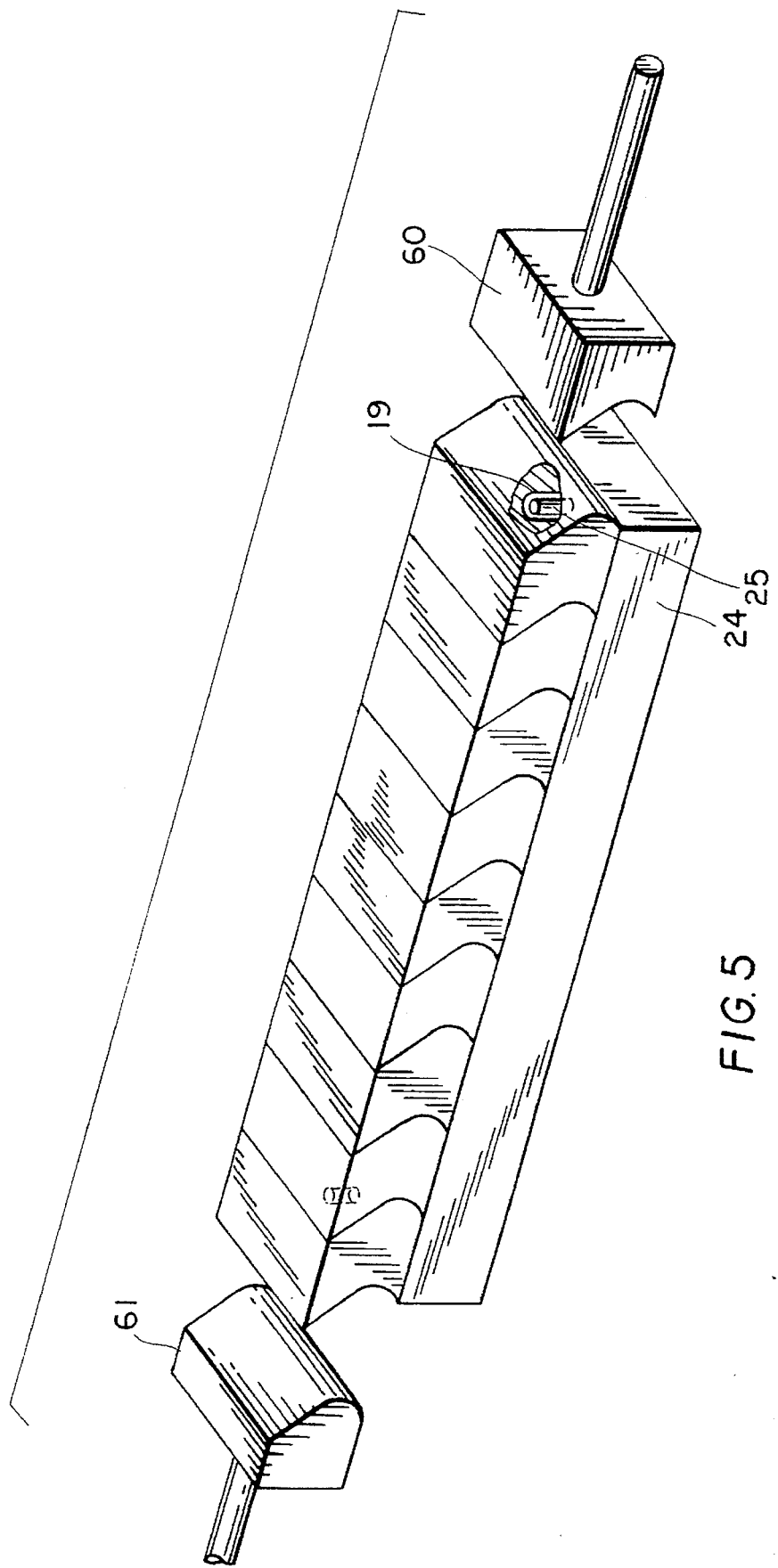
FIG. 5 shows the mandrels of FIG. 4, after braiding, cutting and separating, the mandrels side stacked and mounted on a chassis.

The mandrels are separated after the fibers have been cut and the spacers are removed. Referring to FIG. 5, the preformed mandrels 14 are side stacked on a chassis 24, with the sockets 19 in the mandrels in alignment with pins 25 in the chassis. These pins are disposed in such a way that the mandrels will be precisely located and the fiber preforms compacted to provide a predetermined thickness or spacing between the mandrels. This provides superior dimensional reproducibly in the wall thickness between the mandrels. Typically, only the end mandrels need be pinned. However, if stricter positional and thickness tolerances are needed, each mandrel can be positively positioned in this manner. Also, the through rod holes may be used for alignment, with pins driven through the mandrels into holes in the chassis, where multiple chasses are stacked for molding, a sub-plate which supports a plurality of chasses is provided, and pins maybe driven through the mandrels and chasses into the sub-plate, or extended chasses used with pins placed through the end chasses into the sub-plate.

Two complimentary rams 60 and 61 are used to assist in compacting the mandrels and aligning the sockets with the pins. Side rams may also be provided, to assure complete alignment. The number of mandrels used should equal the number desired for a particular multi-cavity structure. Once mounted on the chasses, the mandrels and chassis are loaded into a mold as a unit for molding.

Figure 6:
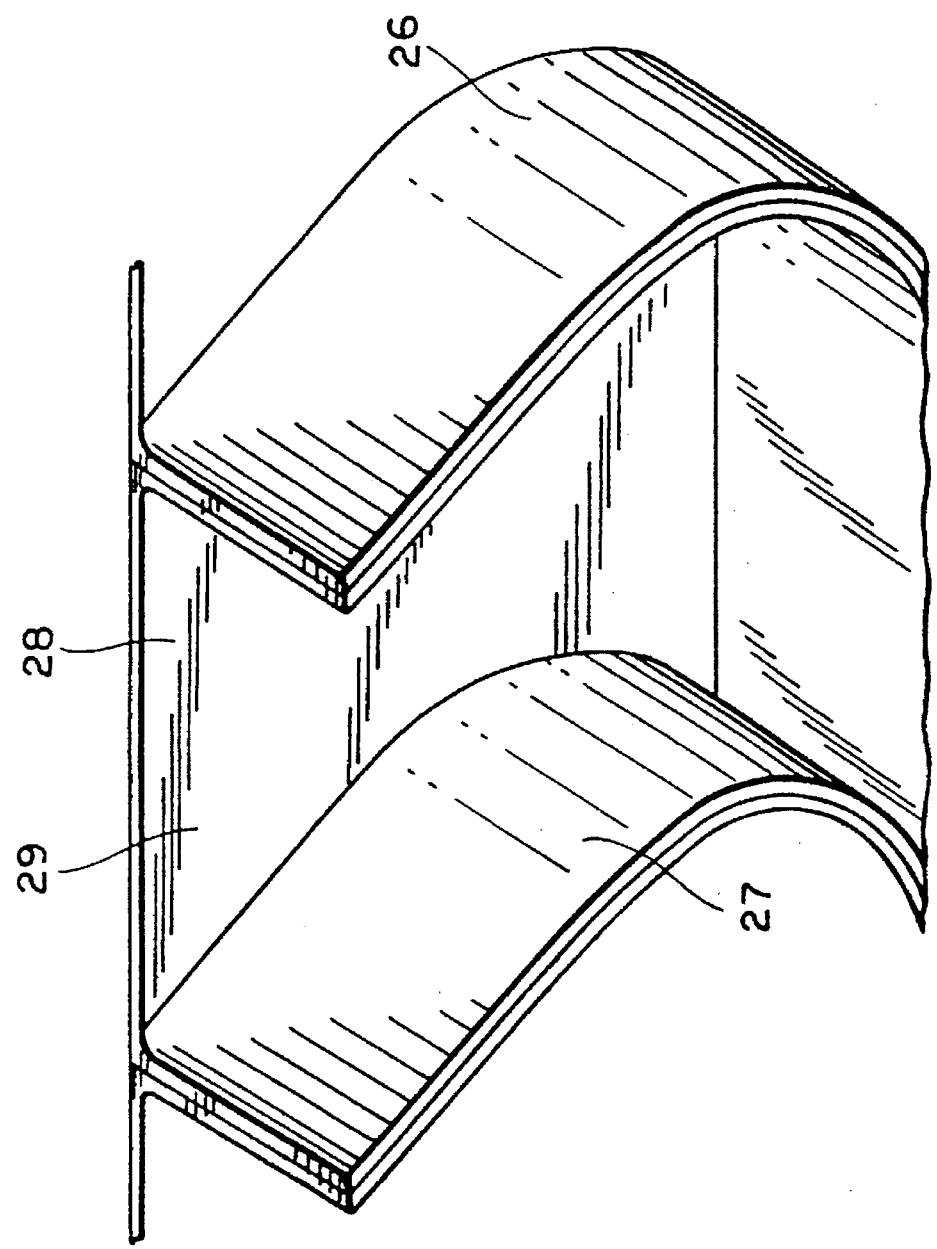
FIG. 6 is an enlarged view showing a pair of vanes in cross-section.

Referring to FIG. 6, a cross section of two vanes 26 and 27, and a platform 28 are shown, surrounding a cavity 29. The final thickness of each vane is nominally twice the braided preform thickness, with each pair of vanes being integrally connected as the tightly braided fibers surround the cavity and forms the platforms. Thus, a high strength and stiff cellular arrangement is produced and there are no seams in the critical regions between the vanes and the platforms. The braided fibers are continuous throughout the cavity perimeter, resulting in a tight, net shape preform around each wall that forms the cavity structure.

To produce individual radial compressor vanes, additional cuts through the platform 28 would be made. Such a vane would have the advantage of the double preform thickness, and the platforms would be integral with the vane, again avoiding seams and providing a high strength part.

Figure 7:
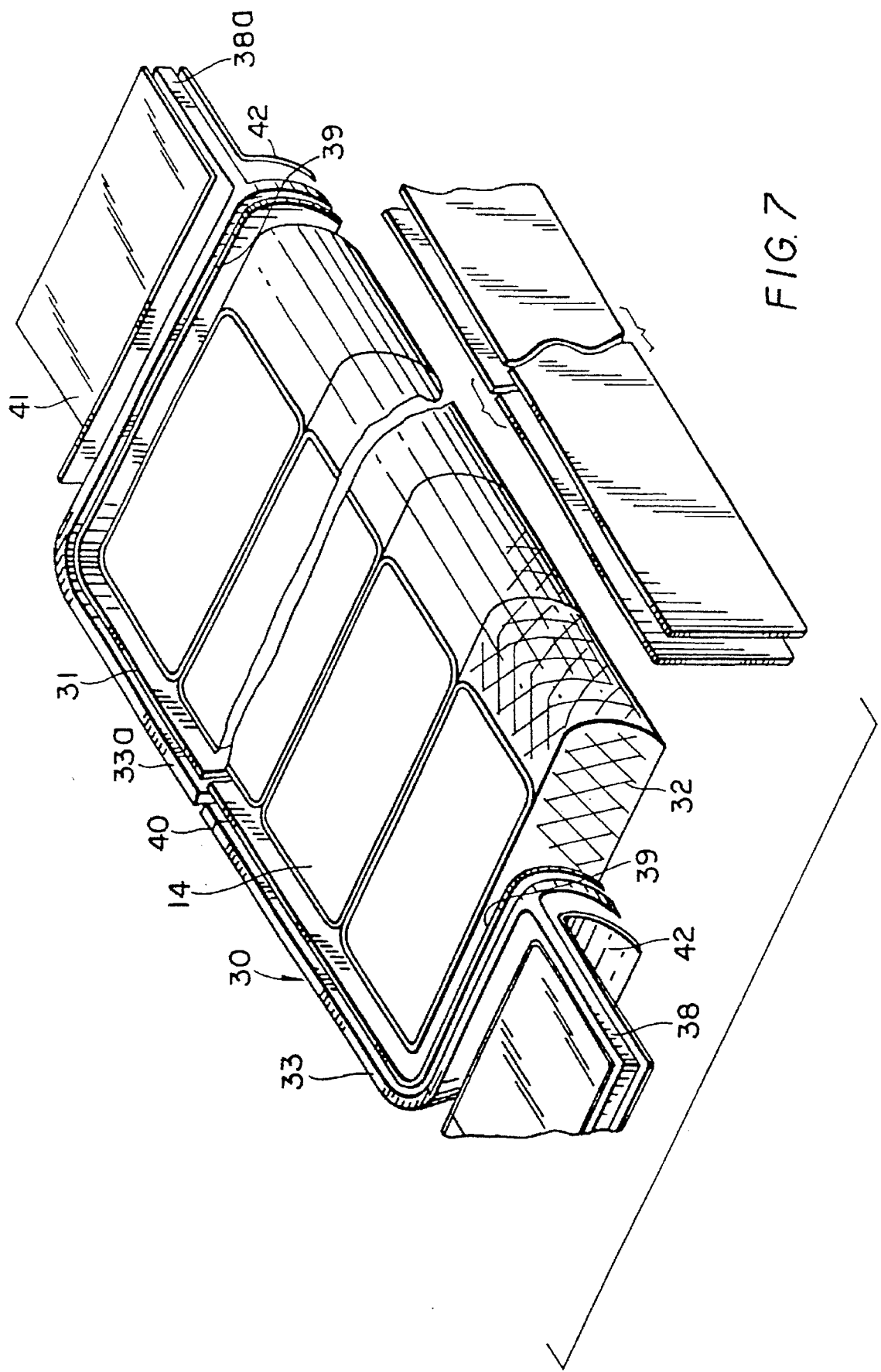
FIG. 7 is a view showing woven plies surrounding the side stacked braided mandrels.

In a preferred embodiment, shown in FIG. 7, an over-wrap 30 of woven fibers is applied around the periphery of the side-stacked mandrels 14 prior to molding. Preferably, the over-wrap comprises a first-wrap around ply 31 which surrounds the braid 32 on the mandrels with a strip of through the thickness weave fiber material, preferably composed of the same fibers as those used for braiding.

Figure 8A:
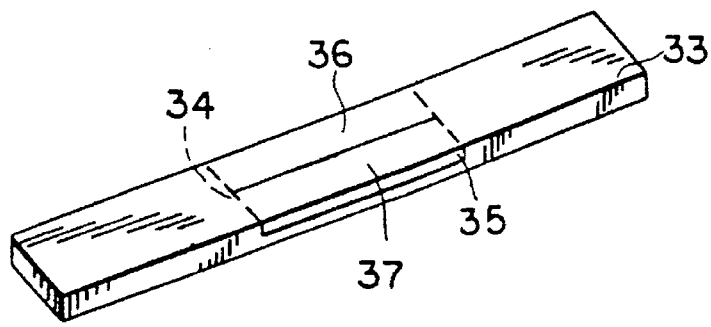
FIGS. 8a–d show the preparation of a conformal woven wrap-around strip for incorporation with the side stacked braided mandrels.
Figure 8B:
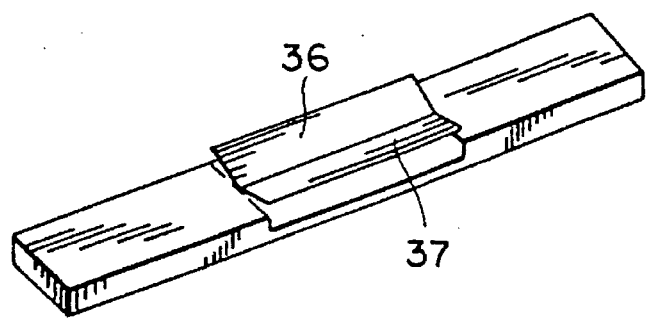
Figure 8C:
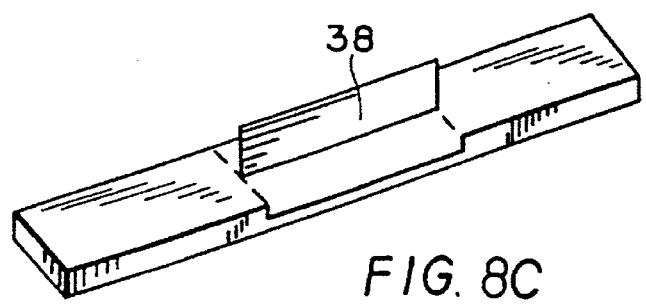
Figure 8D:
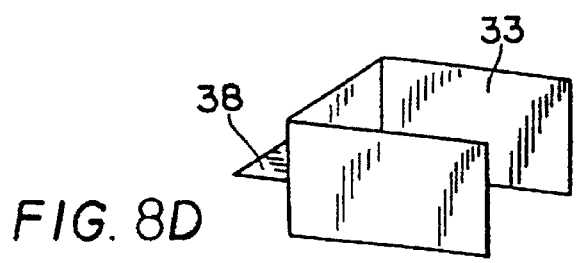

Referring to FIG. 8a, a woven strip 33, has four layers with a through the thickness warp construction. A cut 34 is made through the warp threads along the dotted line, to release the outermost layer 35 along the cut edges. The released material forms two flaps 36 and 37 which are folded together as shown in FIGS. 8b and 8c, and are thus made perpendicular to the outer layers. The dotted lines are spaced at a distance which matches approximately the width of the side stacked mandrels. This outer layer of folded material forms an end flange 38 for the cascade. FIG. 8d shows the strip ready for application to the mandrel stack.

Referring again to FIG. 7, the first wrap-around ply 31 is applied to the braid 32 on the mandrels 14 mounted on the chassis to completely surround the mandrels. This ply may comprise several sections, as shown by seams 39. Two identical woven strips, 33 and 33a, separated by seam 40, including two flanges 38 and 38a are prepared as described above, and are added to each end of the over-wrapped assembly. Upper and lower reinforcing plies 41 and 42 are added to the flanges to increase strength and other plies may be included over any seams in the assembly if desired. While some lay up is required, it is not as labor intensive as would be required to lay-up each mandrel nor would it be possible to achieve continuous fibers around each cavity as is achieved by the present invention.

Figure 9:
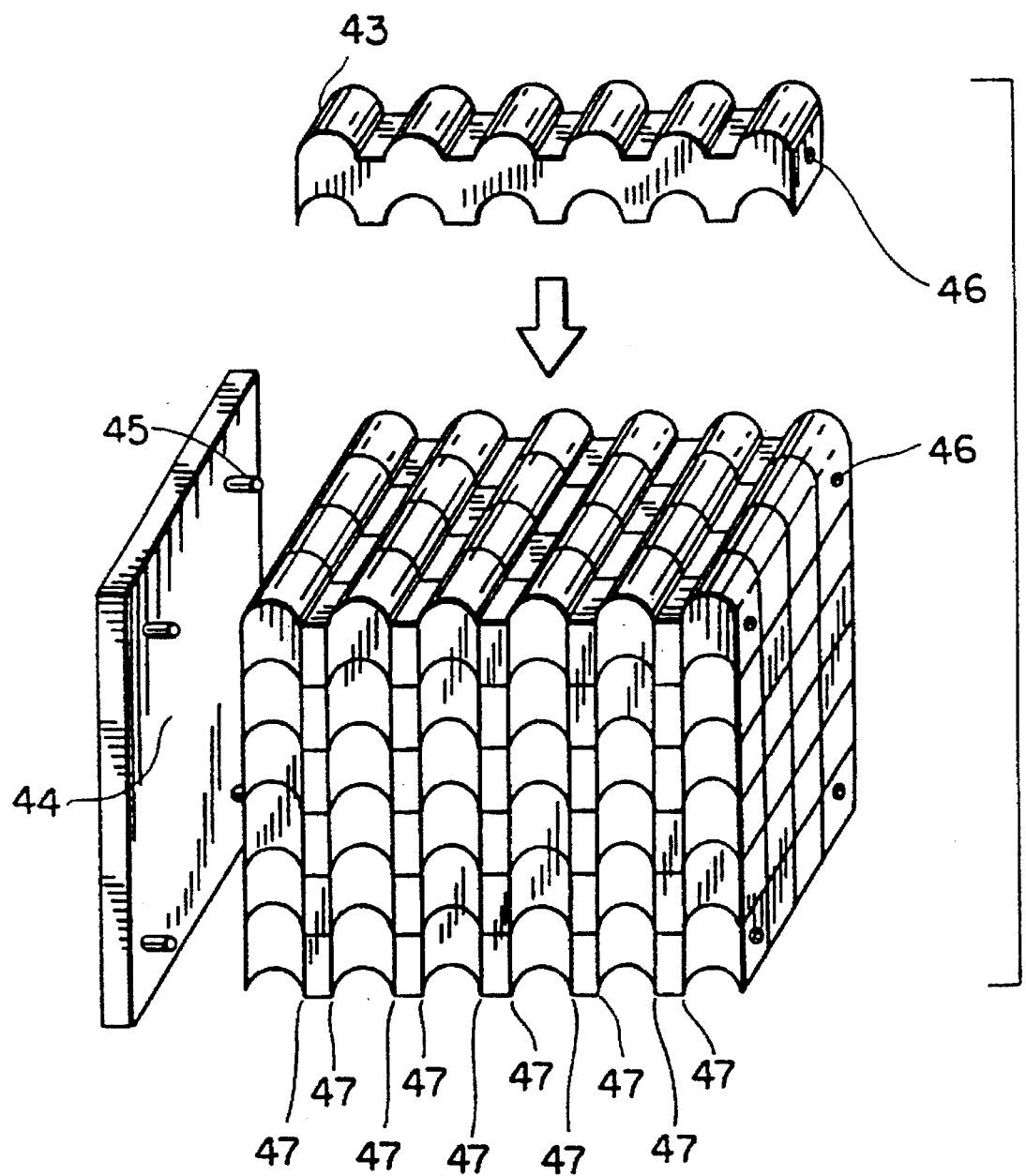
FIG. 9 is an alternative embodiment of the present invention having multiple braided assemblies stacked to produce a multiple of complete cascade sections without cutting and side stacking prior to molding.

Referring to FIG. 9, an alternative embodiment of the present invention is shown where twenty four braided mandrel assemblies 43 are stacked and molded. End plates 44 having mounting pins 45 similar to those described for the chassis are matable with sockets 46 for maintaining the spacing of the assemblies. These sockets can either be the passage 21 for the through rods or the socket 19 described previously.

In this embodiment, the mandrels are not cut, separated and side stacked prior to molding. Rather, the end plates assure proper spacing between the mandrels, to produce cascade segments of uniform thickness, and, once assembled, the entire stack is molded. Stabilization is used at the end of each assembly only. After molding and cure, cuts are made along lines 47 adjacent the spacers and six complete cascade sections, each having twenty four cavities, are produced. Over-wrap strips and flanges can be incorporated over the stacked assemblies as a unit rather than by piece, to complete each section in one step, if desired.

Figure 10:
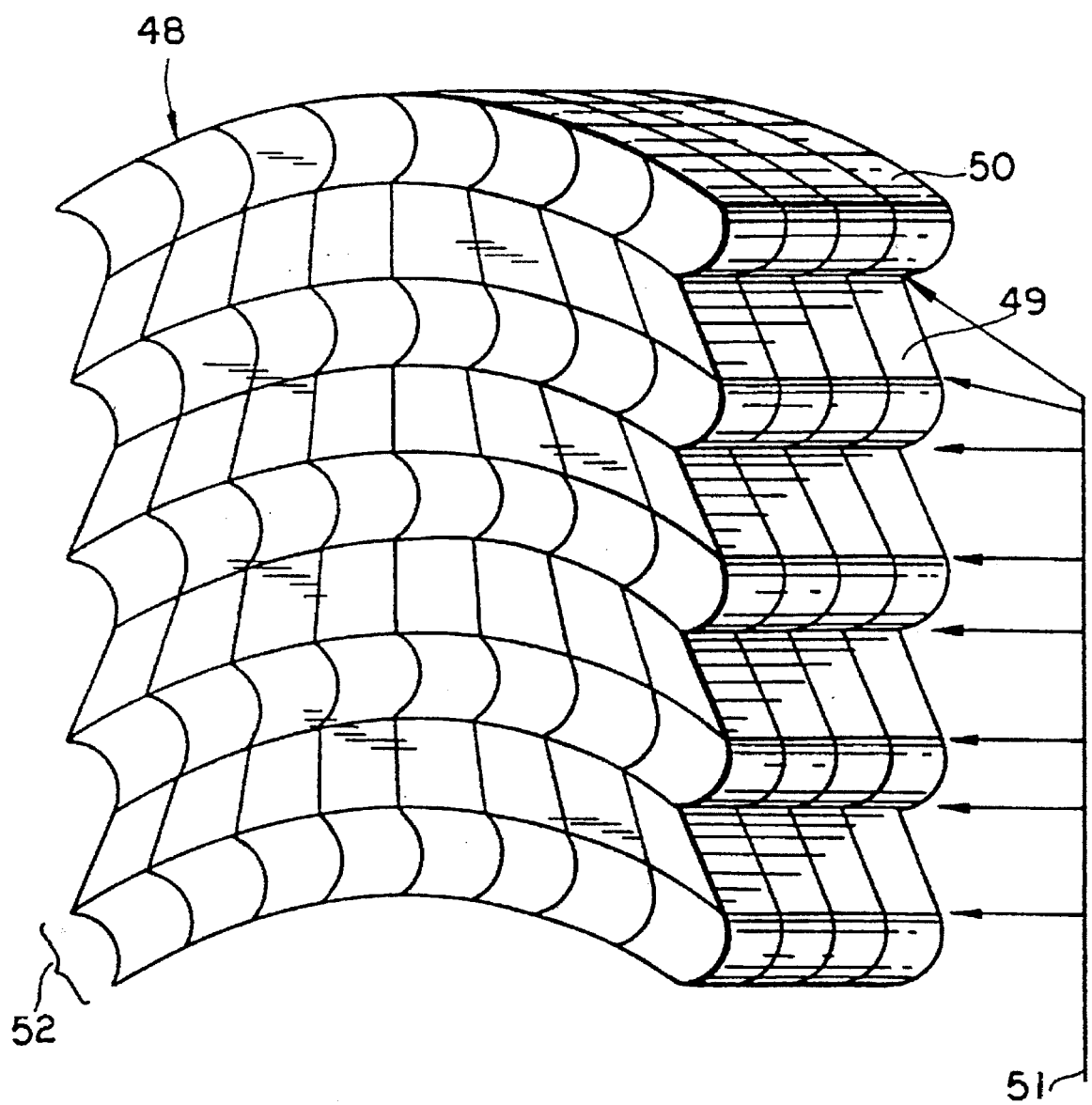
FIG. 10 shows the orientation of multiple braided assemblies when used to produce multiple radial parts.

Referring to FIG. 10, where radial braided parts are required, braided mandrel assemblies 48 are stacked to produce radial curved segments, with spacers 49 designed to vary in size and angle to accommodate and allow placement in a multiple assembly stack while producing the proper angular orientation and location of each mandrel 50. Cuts are made along lines 51 to produce five part sections 52. Of course, the spacer shape will depend on the degree of curvature and complexity of the cavities required. Several different spacer shapes are used here.

The spacers shown in FIG. 10 allow the mandrels to be produced in a manner which provides a radial orientation to the adjacent cavities thus defining a plurality of vanes structures incorporated in platforms which conform to a circular engine configuration.

Figure 11:
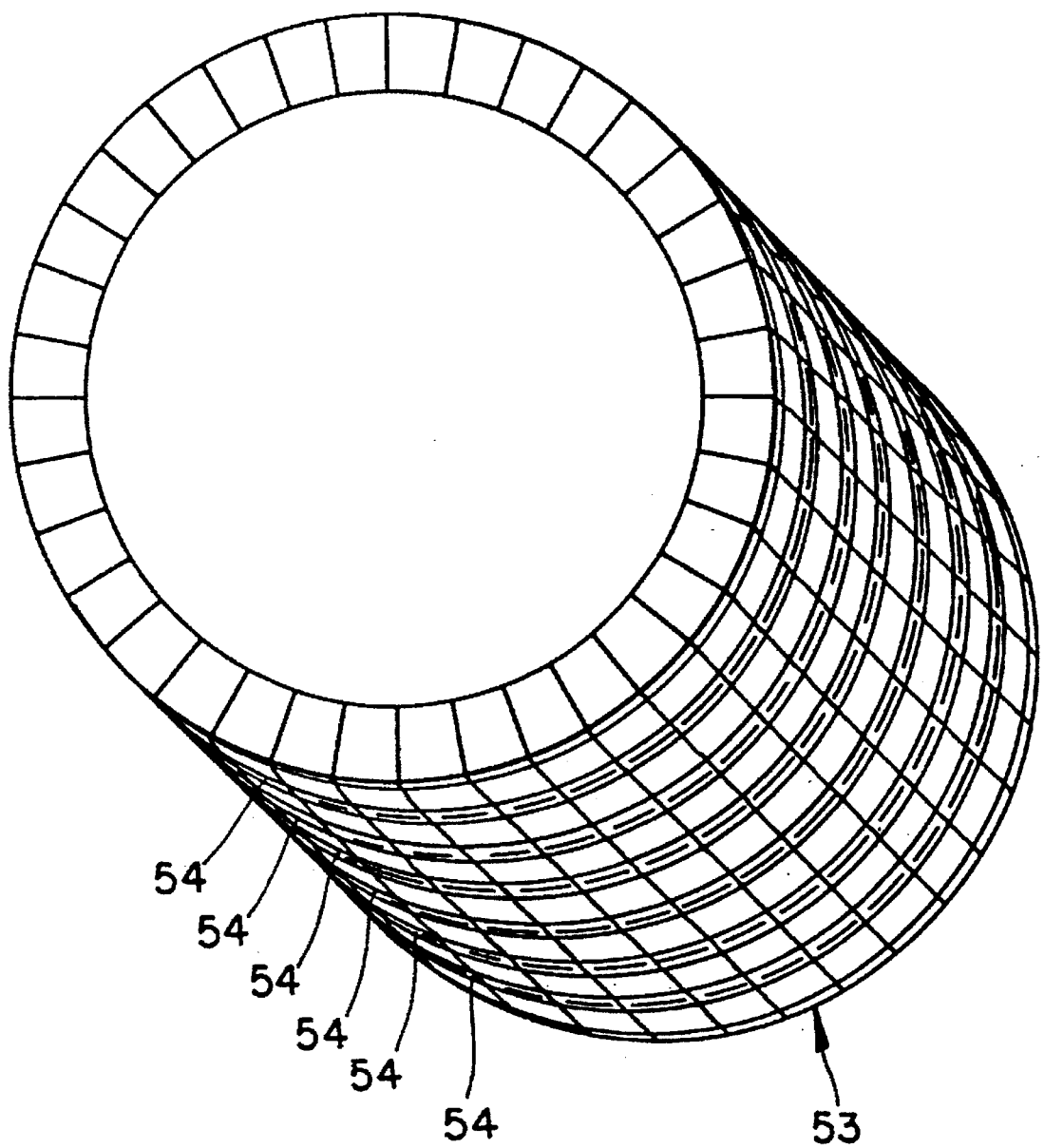
FIG. 11 shows the orientation of multiple braided assemblies when used to produce multiple passage tubular parts.

Referring to FIG. 11, a tubular structure is produced. Braided mandrel assemblies 53 are assembled in a cylindrical orientation. Cuts are made along lines 54 to produce circular sections which may further be cut into segments.

Once assembled according to any embodiment of the invention, the braided mandrels are placed in a mold and resin injected. Any type resin may be used. For example thermosetting resins such as epoxy, phenolic, polyurethane, polyester, vinyl ester, bismaleimide, polyimide, etc, or thermoplastic resins such as polyetheretherketone, polyetherimide, polyarylsulfone, or polyamideimide. Ceramic resins such as silicon, carbide, alumina, silica or silicon nitride are contemplated for use with the invention For exemplary purposes, the multi-vane structure is molded of epoxy resin and braided with BASF-CELION™ G30-500 graphite fibers. The braiding is preferably performed with dry fibers treated with a binder used as a stabilizer which is compatible with the epoxy resin chosen for molding. Pre-impregnated fibers may also be used. The cascade is preferably molded using resin transfer molding (RTM) though the choice of molding technique may be left to the practitioner.

After the molding process is completed, the mandrels are removed by heat if made of a material which melts at a low enough temperature to prevent damage to the articles produced or removed by solvents such as hot water or organic liquids.

Whichever process is used to produce the part, additional processing may be required for finishing such as the drilling of holes for bolting, trimming of excess resin along edges, radiusing of edges etc. Of course, the steps used after molding depend on the application for which the part is used and the choice of such steps is left to the practitioner.

While the preferred embodiments of the present invention have been described in relation to the production of a multi-vane structure for incorporation on aircraft gas turbine engines, it will be understood by those skilled in the art that various changes or modifications could be made to adapt the process for producing numerous unique braided complex composite structures, without varying from the scope of the invention.

We claim:

1. A method for producing a braided composite part having a complex geometry cavity comprising:

providing a plurality of net shaped removable mandrels each having a shape to match the cavity, stacking the plurality of net shaped removable mandrels in an end to end configuration, to form an assembly, braiding fibers over the assembly, at a braid angle sufficient to assure conformance of the fibers to the mandrel surfaces, placing the braided mandrels into a mold, and injecting resin into the mold to produce the braided composite part.

2. The method of claim 1 further comprising cutting the braided fibers at the junctions between the mandrels and placing the separated mandrels in a side by side relationship prior to placing the braided mandrels into the mold.

3. The method of claim 2 further comprising stabilizing the braided fibers at the junction between the mandrels.

4. The method of claim 1 further comprising placing spacers between the end of the mandrels.

5. The method of claim 1 further comprising providing a central passage through the mandrel assembly and inserting an alignment rod through the passage.

6. The method of claim 2 further comprising providing a chassis on which the separated mandrels are placed prior to placing the braided mandrels into the mold.

7. The method of claim 2 further comprising providing an over-wrap of woven fibers and surrounding the side stacked mandrels with the over-wrap.

8. The method of claim 1 further comprising providing a plurality of braided mandrel assemblies, stacking the plurality of braided mandrel assemblies, placing the stacked assemblies into a mold and injecting resin into the mold to produce molded assemblies and cutting the molded assemblies into a plurality of braided composite parts.

9. The method of claim 8 wherein the assemblies are radially stacked to produce radial braided composite parts.

10. The method of claim 8 wherein the assemblies are cylindrically stacked in a tubular configuration to produce circular braided composite parts.

* * * * *